(No Model.)
C. F. BRUSH.
CURRENT MANIPULATOR FOR SECONDARY BATTERY CHARGING.
No. 281,175. Patented July 10, 1883.
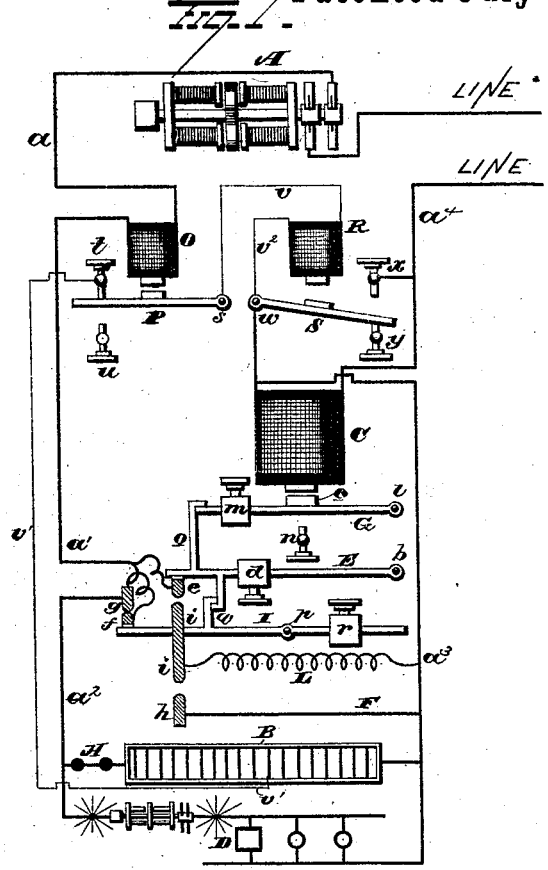
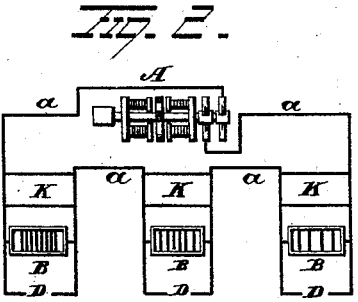
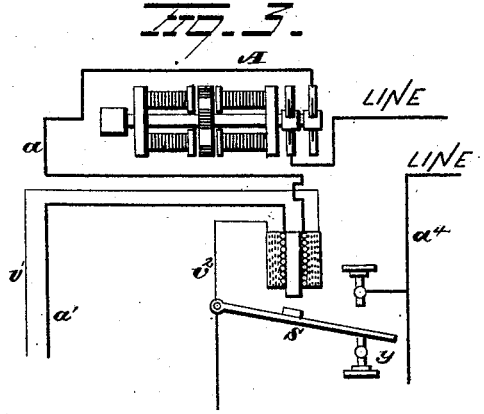
WITNESSES
G. I. Nottingham,
G. F. Downing.
INVENTOR
Chas. F. Brush.
By Leggett & Leggett.
Attorneys.

UNITED STATES PATENT OFFICE.

CHARLES F. BRUSH, OF CLEVELAND, OHIO.

CURRENT-MANIPULATOR FOR SECONDARY BATTERY CHARGING.

SPECIFICATION forming part of Letters Patent No. 281,175, dated July 10, 1883.

Application filed June 19, 1882. (No model.) Patented in England July 1, 1882, in Belgium July 22, 1882, in Germany July 25, 1882, in France July 26, 1882, in Italy September 30, 1882, in Cape of Good Hope December 15, 1882, in Spain February 1, 1883, in Austria April 15, 1883, in Portugal May 2, 1883, and in India May 8, 1883.

*To all whom it may concern:*

Be it known that I, CHARLES F. BRUSH, of Cleveland, in the county of Cuyahoga and State of Ohio, have invented certain new and useful Improvements in Current-Manipulators for Secondary Battery Charging; and I do hereby declare the following to be a full, clear, and exact description of the invention, such as will enable others skilled in the art to which it pertains to make and use the same.

My invention relates to secondary batteries, or apparatus for the storage of electrical energy; and it consists in devices hereinafter described, or their equivalent, for automatically manipulating the current employed in charging such batteries. My devices for this purpose are such that, first, when no current is acting in the charging-circuit, the one or more batteries in connection therewith will be open-circuited, so far as the charging-circuit is concerned, and the latter will be "short-circuited" around each battery. Also, second, when the charging-current is fully established in the charging circuit or line, the "short circuit" around each battery will be opened and the battery thrown into the charging-circuit. Also, third, when each battery becomes fully charged, it will, independently of any other battery in the charging-circuit, be thrown out of the charging-circuit and the latter will be short-circuited around the battery, as at first. Again, when the charging-current stops or becomes greatly lessened, each battery, whether fully charged or not, will be thrown out of circuit, and the line short-ciruited as before. Also, fourth, while the charging-current is acting, each battery, whether fully charged or not, may be automatically disconnected from its individual working or discharging circuit. These automatic operations prevent the inverse discharge of the batteries through the charging-line when the charging-current is discontinued, prevent reversal of polarity in the dynamo-machine when such is employed for charging, leave a closed circuit for the charging-current to re-establish itself in when recharging or continued charging of the battery is desired, and avoid waste of current energy by stopping the current through a battery when the latter is fully charged. Other important advantages attend the use of my automatic apparatus, as will appear later in this specification.

My automatic apparatus, although well adapted to control the charging of a single secondary battery, is especially designed to regulate the charging from a single current source of many batteries.

Each battery may consist of any desired number of elements or cells, irrespective of the number of elements in any other battery. The several batteries may be charged in "multiple arc," or in "series multiple arc," or in simple "series." The latter is the preferable method, and is the one I shall more particularly describe.

In order to secure all of the advantages pertaining to my invention, each battery should in either case be provided with my current-controlling device.

I have specified that when a battery becomes fully charged it will be thrown out of circuit and the latter closed through another channel. This may, and generally will, occur while the charging-current is in full force. In the performance of this operation it certainly will not do to close the short circuit around the battery before disconnecting the latter from the line, because then the battery would at once commence to discharge itself with very great energy through this short circuit, and the subsequent disconnection of the battery from the line would be attended by the destruction of the parts where the break occurred. On the other hand, the battery could not be entirely disconnected from the charging-line before closing the short circuit, as this would entail the stoppage of the current in the whole system of batteries. A partial break might be made by establishing an arc at one end of the battery long enough to prevent the discharge of the latter across the interval when the short circuit is established; but this would be very objectionable not only on account of the burning of the points where the separation occurs, but because of the extra resistance (that of the arc) suddenly introduced into the charging-circuit. Obviously, similar difficulties would occur in throwing a battery into the charging-circuit. I avoid these difficulties by using a resistance and by making the operation of throwing a battery out of or into the charging-circuit consist of a series of steps, as follows: In throwing a battery out of circuit, the first step consists in the introduction of a resistance parallel with the battery, between which and the battery the charging-current may divide itself; but I make this resistance so small that substantially the whole of the charging-current passes through it, while at the same time the resistance is great enough, being occupied by the charging-current, to prevent a discharge from the battery through it. The next step disconnects the battery from the line, leaving in lieu thereof the resistance. The third step short-circuits the resistance and completes the operation. Thus a battery may be thrown out of the charging-line without any disturbance of the latter's current, and without any sparks whatever if the resistance be carefully adjusted. Even if the resistance is only approximately adjusted, the sparks will be small and entirely harmless. In throwing a battery into the charging-circuit, these steps are reversed. First, the short circuit is opened, throwing the current into the resistance. This will of course be attended by a flash, which, however, is comparatively small, and is harmless. This flash may be divided into a number of much smaller ones by introducing, successively, increasing resistances; but this is an entirely unnecessary refinement and complication, and I will not again allude to it, after stating here that, while I prefer to use a single resistance, I do not wish to be understood as confining myself to it. The next step connects the battery, and the third and last step opens the resistance, throwing all of the current through the battery. This last step will of course be attended by another flash, which, however, is smaller than the first, and quite unimportant. When the charging-current stops or diminishes in the act of stopping, or otherwise, then any battery which has not already become fully charged and switched itself out of the circuit will be thrown out by the same series of operations which would have occurred had it been previously fully charged.

In designing and adjusting my automatic mechanism I prefer to so arrange matters that the function of throwing the batteries into the charging-circuit, which is exercised when the charging-current is established, shall not be called into action until the charging-current has approximately reached its normal strength. By this precaution I secure an advantage of much importance when a large number of batteries are to be charged.

I have neglected to mention that one of the objects of my invention is to provide for the unequal use of the several batteries of a system between or during the times of charging, and here call attention to this point as an aid to my present explanation. I will also add that I contemplate locating the several batteries of my system not necessarily in one place, but at many points, which may be widely separated, to the end that the batteries may be independently employed in different buildings or localities for lighting or other purposes, all the batteries being connected by the charging-line. Suppose, now, that we have a hundred or more batteries all connected with one charging-line, and that the dynamo-machine used for charging is capable of simultaneously charging, say, twenty batteries only. Suppose, also, that the hundred batteries have been unequally exhausted since the last time of charging. Now, since it would be impossible to so adjust the automatic devices pertaining to the several batteries that the latter would all be thrown into the circuit by the same strength of current, it follows that as the charging-machine is set in motion and the charging-current approaches normal strength first one battery (that whose current-regulating device responds to the least current) will be thrown into circuit, then another, and so on until any further increase of current will be prevented by the opposing electro-motive force of the batteries already in circuit. We will now have, say, twenty batteries in circuit, and these will continue to receive the charge until one or more of them (those of the twenty which have been the least exhausted since the previous time of charging) become fully charged and are thrown out of circuit and the line short-circuited around them. This will slightly increase the charging-current, owing to the decrease of resistance in the line, and one or more new batteries will be thrown into the circuit until increase of current is checked as before. Thus the whole hundred batteries will in time become charged, an automatic current-regulator at the dynamo-machine preventing undue increase of current when the last twenty batteries are one after another thrown out of circuit. When the last twenty batteries on the line begin to cut out, which may be known by the action of the current-regulator at the charging-machine, another line of discharged or partially-discharged batteries may be switched into the circuit; and when it is deemed that the remaining batteries of the first line have finished charging this line may be switched out of circuit. Thus it will be seen that one charging-machine may be made to charge an indefinite number of secondary batteries, the number depending only on the initial capacity of the machine, the length of time it is run, and the amount of charge used from the batteries.

It will also be seen that the various batteries of an extended system may be used little or much, discharging a small or large current continuously or at irregular intervals, while the operation of recharging is under perfect and automatic control, and no current energy is wasted in overcharging any battery.

In the drawings, Figure 1 illustrates one convenient form of apparatus embodying my invention. Fig. 2 represents a system of secondary batteries all charged from one line, each battery being provided with a current-manipulator. Fig. 3 shows a combination or compound arrangement of the magnets O and R, Fig. 1.

In Fig. 1, A represents a current-generator, which may consist of a dynamo or magneto electric machine or other apparatus capable of furnishing a suitable current.

B is a secondary battery.

C is an electro-magnet located in the circuit $a\ a'\ a^2\ a^3\ a^4$, connecting the generator and battery.

D represents a number of electric lamps, electric motors, or other electro receptive or translating devices.

E is a lever pivoted at $b$. This lever may be provided with an adjustable weight, $d$, if desired. The free end of the lever E carries a contact-point, $e$, which is connected by a flexible conductor or otherwise with the charging-line $a'$. G is another lever, pivoted at $l$, and provided with an armature, $c$, facing the pole or poles of the magnet C. This lever may be of iron, and the armature $c$ dispensed with. The lever G may be provided with an adjustable weight, $m$, if desired.

$n$ is an adjustable stop limiting the downward motion of the lever G. By means of an arm, $o$, attached to the lever E, and which engages with the lever G after the latter has commenced to rise in obedience to the attraction of the magnet C, the lever E is also raised.

I is a lever pivoted at $p$, and connected by catches $q$ (or an equivalent link) with the lever E in such a manner that I is held up by E when the latter rises, while E may fall independently of I. The lever I carries contact-points $f\ i$, which are insulated from each other. The lever I also carries a counter-weight, $r$, sufficient to raise the other end of the lever carrying the contacts. The contact-point $f$ is flexibly connected with the line $a'$, and the double contact-piece $i$ is flexibly connected with one end of a resistance, L, the other end of which is connected with the line $a^3$. This resistance may be made adjustable, if desired.

$g$ is a stationary contact-piece, connected with the line $a^2$. This contact-piece forms a stop to the upward motion of the lever I, and ultimately to the levers E and G, through the intervention of the catches $q$ and arm $o$. $h$ is another stationary contact-piece, directly connected with the line $a^3$ by a conductor, F. This contact-piece forms a stop to the downward movement of the lever I, and also to that of the lever E, through the intervention of the double contact-piece $i$.

O is a small magnet located in the charging-line $a\ a'$. It is provided with an armature attached to a lever, P, which is pivoted at $s$. The whole lever may be of iron, and the separate armature dispensed with. When P is drawn up by the magnet O, it makes contact with a stop, $t$, and when P falls it is arrested by a stop, $u$.

R is a magnet of high resistance, arranged as a shunt around the whole or a part of the battery B by means of the conductor $v$, lever P, stop $t$, conductor $v'\ v'$, and conductors $a^3\ v^2$, the current flowing through conductor $v'\ v'$, lever P, conductor $v$, magnet R, conductor $v^2$, and main-line or charging circuit $a^3$ to the other end of the battery. The conductor $a^3$ thus constitutes part of the charging and part of the shunt circuit, the effect being the same as if the conductor $v^2$ should be extended and connected with the battery to complete the shunt-circuit. The magnet R is provided with an armature-lever, S, pivoted at $w$. When the lever S is raised by the magnet R, it makes contact with a stop, $x$, (which may be made adjustable,) which stop is connected with the line $a^4$. $y$ is an adjustable stop limiting the fall of the lever S. A conductor of fusible metal, H, may be employed for the purpose of opening that part of the circuit by fusion if the charging or discharging current becomes greatly abnormal in quantity from any cause.

The diagram just explained shows the various movable parts of the apparatus in the positions which they occupy while the generator A is charging the battery B. The current passes from the generator through the line $a$, magnet O, line $a'$, contacts $f\ g$, line $a^2$, battery B, line $a^3$, magnet C, line $a^4$, and through any other apparatus there may be in the working or charging circuit back to the generator. The magnets O and C, being energized by the current, will retain their armatures in the positions shown. While the battery B is charging, the difference of electrical potential between its ends, or between any two points of the battery, remains nearly constant; but when the battery becomes fully charged free gases are evolved from its elements, and the difference of electrical potential between any two parts of the battery at once increases materially. The number of elements of the battery B, working the shunt-magnet R, and the distance of the armature S from the poles of the said magnet, are so adjusted that while the battery B is being charged the magnet R will not be sufficiently energized to raise its armature S, while at the same time this adjustment is such that, when the potential of the battery B rises at the completion of the process of charging, the increased current thereby shunted through the magnet R shall enable the latter to raise its armature. This adjustment may also be effected through the agency of an adjustable weight (not shown) attached to the armature or armature-lever S. When the armature-lever S rises and makes contact with the stop $x$, the magnet C will be short-circuited, because the current from the line $a^3$ may now pass through the lever S and stop $x$ to line $a^4$. Thus the magnet C is paralyzed sufficiently to allow the lever G to drop. This in turn allows the lever E to fall and the contact-point $e$ to make contact with the conductor $i\ i$. Thus the whole or a part of the current from the line $a'$ is shunted from the battery B through the resistance L. The continued fall of the lever E, carrying with it the lever I, next breaks contact between the points $f\ g$, and thus disconnects the battery B from the line $a'$ and leaves the whole current from the latter in the resistance L. Finally, the contact-piece $i\ i$ makes contact with the piece $h$, thus short-circuiting the resistance L through the conductor F. This completes the operation of disconnecting the battery from the charging-line and short-circuiting the latter around the battery.

When a secondary battery discharges its current through a resistance sufficient to prevent a too rapid discharge, the electro-motive force of the battery remains nearly constant until its charge is nearly exhausted, after which the electro-motive force falls rapidly. Hence, by suitably adjusting the minimum distance of the armature S from its magnet by means of the adjustable contact-stop $x$, the armature S will fall when the electro-motive force of the battery B is reduced toward the close of the process of discharging. This will allow the magnet C to be re-energized if current is acting in the line $a\ a'$, &c., and the lever G will be raised, and with it the levers E and I, thus throwing the battery B into the charging-circuit. If current is not acting in the circuit $a\ a'$, &c., then the magnet C will still be left ready to act when the charging-current again starts. But there are many objections to letting the battery B become nearly or quite discharged before recharging, one of which is that, should the battery become exhausted while the line $a\ a'$, &c., is not supplied with current, the battery will for the time become useless. To avoid these difficulties, I use the magnet O, through the agency of which, when energized by the charging-current, the shunt-circuit through the magnet R is established and maintained; but when the charging-current stops the armature-lever P falls, the shunt-circuit through R is opened, the armature-lever S falls, and the short circuit around the magnet C is opened, leaving the latter ready to act when the charging-current again starts, and all of this irrespective of any particular condition of the battery B. Again, the opening of the shunt-circuit while the charging-current is not acting prevents any unnecessary waste of current through the shunt.

Let us now follow the operations which take place when the charging-current starts and the levers G, E, and I are at their lowest points. Matters have been so adjusted by means of the adjustable weight $m$ or the adjustable stop $n$, or both, that the lever G will not respond to the attraction of the magnet C until the charging-current, which excites the magnet, has reached a certain strength, which is approximately its normal strength. Before this point is reached, however, the current may have been for some time charging other batteries, as hereinbefore explained. When the proper current strength is reached, the lever G rises, and presently engages the arm $o$, attached to the lever E. By this time the armature $c$ has approached nearer to its magnet, whose attraction has thus become sufficient to carry upward not only the lever G, but also the lever E, which is finally stopped by the contacts $f\ g$ coming together. It will be noticed that the weight of the lever E is available to maintain a good contact between the points $e\ i\ i\ h$ until the instant of their positive separation. The reason for employing the independent lever G is now apparent. If the magnet C were made to act directly on the lever E, then the contacts $e\ i\ i\ h$ might for long periods be almost entirely relieved from the weight of the lever, whereby these contacts would be liable to destruction by burning. When the lever E begins to rise, the contact end of the lever I follows, owing to the counter-weight $r$, as before specified. Thus the contact $e\ i$ is preserved, while the contacts $i\ h$ are opened, which operation throws the resistance L into the charging-circuit. Immediately thereafter the contact-points $f\ g$ come together, arresting further movement of the lever I and throwing the battery B into the charging-circuit. The lever E, continuing to move upward, separates the contact-points $e\ i$ and opens the resistance L, thus throwing all of the charging-current into the battery B. Finally, upward movement of the lever E is arrested by the catches $q$, and the strong attraction of the magnet C for its armature is then exerted in maintaining a good contact between the points $f\ g$, through which all of the charging-current now passes.

I prefer to make the contact points or pieces $e\ f\ g\ h$, &c., of carbon, such as is used in electric-arc lighting.

Fig. 2 of the drawings illustrates a system wherein a current-generator, A, charging circuit or line $a\ a$, automatic current-controlling devices K, secondary batteries B, and electro-receptive devices D are associated and combined as has been hereinbefore described.

Fig. 3 shows a combination or compound arrangement of the magnets O and R, Fig. 1, wherein the helix of the magnet O is combined with that of the magnet R, the core of the latter being common to both helices. The electrical connections are so made that the main or charging current and the shunt-current circulate in the same direction around the common core, and thereby act jointly in magnetizing the latter and attracting the armature-lever S. The main current remaining constant, increase of current in the shunt-circuit, due to rise of potential in the battery at the completion of its charge, will enable the magnet to raise its armature and produce the results already described in connection with Fig. 1. When, however, the charging-current stops, the magnet R will be so weakened as to drop its armature the same as when the shunt-circuit was opened by the fall of the armature P in Fig. 1.

By the term "gradually" as used in the claims is meant the introduction of a resistance into the short circuit around the battery in switching the battery into and out of the charging-circuit.

All features of my invention not herein claimed are or will be incorporated and claimed in one or more divisions of this application.

The invention set forth in the foregoing specification is described in foreign patents granted to me as follows: Great Britain, July 1, 1882; Belgium, July 22, 1882; France, July 26, 1882; Germany, July 25, 1882; Italy, September 30, 1882; Cape of Good Hope, December 15, 1882; Spain, February 1, 1883; Austria, April 15, 1883; Portugal, May 2, 1883, and India May 8, 1883. The applications for all of the above-named foreign patents were filed after the date of filing the application for this patent.

What I claim is—

1. The combination, with an electric generator, a main or charging circuit, and a secondary battery, of suitable mechanism for diverting the entire charging-current around the battery, and for automatically and gradually switching the secondary battery into the charging-circuit when the charging-current has approximately reached its normal strength, (and not until then,) substantially as set forth.

2. The combination, with an electric generator, a main or charging circuit, and a secondary battery, of a magnet and switch mechanism actuated thereby, said magnet adapted to be energized by the current from the generator, and adjusted to allow the entire charging-current to pass around the battery until the charging-current has approximately reached its normal strength, and then to operate the switch and switch the secondary battery gradually into the charging-circuit, substantially as set forth.

3. The combination, with an electric generator, a main or charging circuit, and a secondary battery, of a resistance and mechanism operated automatically whereby said resistance is caused to act as a temporary shunt for the charging-current around the secondary battery during the operation of switching the battery into or out of its charging-circuit, substantially as set forth.

4. The combination, with an electric generator, a main or charging circuit, and a secondary battery, of suitable means for automatically switching said battery gradually out of the charging-circuit, when the electrical potential of the battery shall have reached a predetermined maximum, without interrupting the charging-current, substantially as set forth.

5. The combination, with an electric generator, a main or charging circuit, and a secondary battery, of suitable means associated with the secondary battery and main or charging circuit, substantially as described, whereby the increased electrical potential of said secondary battery attending the completion of its charge automatically actuates said devices to switch said battery gradually out of its charging-circuit and divert the entire charging-current around the battery without interrupting the charging-current.

6. The combination, with an electric generator, a main or charging circuit, and a secondary battery, of suitable means for automatically switching said battery gradually out of the charging-circuit when the electrical potential of the battery shall have reached a predetermined maximum, and for automatically establishing the charging-circuit around said secondary battery, substantially as set forth.

7. The combination, with an electric generator, a main or charging circuit, a secondary battery, and discharging-circuit having translating devices included therein, of suitable means for automatically switching said battery and discharging-circuit into the charging-circuit when the electrical potential of the battery shall have reached a predetermined minimum, substantially as set forth.

8. The combination, with an electric generator, a main or charging circuit, and a secondary battery, of suitable mechanism, controlled by the electrical potential of the battery, for automatically switching said battery into and out of the charging-circuit, substantially as set forth.

9. The combination, with an electric generator, a main or charging circuit, a secondary battery, an electric circuit of comparatively high resistance, arranged and adapted to act as a shunt to a part or all of the secondary battery, and a magnet, R, included in said shunt-circuit, of devices controlled by said magnet for automatically switching the battery out of the charging-circuit when the battery has been sufficiently charged, and automatically switching it into the charging-circuit when the battery has been nearly or completely discharged, substantially as set forth.

10. The combination, with an electric generator, a main or charging circuit, a secondary battery, a magnet included in the main or charging circuit, and devices actuated or controlled by said magnet for automatically switching said battery into or out of the charging-circuit, of an electric circuit of comparatively high resistance, arranged to act as a shunt to a part or all of the secondary battery, and a magnet, R, included in said shunt-circuit, and adapted to control the operation of the magnet in the main or charging circuit, substantially as set forth.

11. The combination, with an electric generator, a main or charging circuit, a secondary battery, a magnet included in the main or charging circuit, and devices actuated or controlled by said magnet for automatically switching said battery into or out of the charging-circuit, of devices for automatically shunting the charging-current around said magnet when the charging of said battery is sufficiently advanced, substantially as set forth.

12. The combination, with an electric generator, a main or charging circuit, a secondary battery, and an electric circuit of comparatively high resistance, arranged and adapted to act as a shunt to the whole or a part of said secondary battery, of devices for automatically open-circuiting said shunt when the current in the main or charging circuit stops or is greatly diminished, substantially as set forth.

13. The combination, with an electric generator, a main or charging circuit, and a secondary battery, of suitable mechanism for diverting the entire charging-current around the battery, and for automatically switching said battery into the charging-circuit when the electrical potential of said battery shall have reached a predetermined minimum, substantially as set forth.

14. The combination, with an electric generator, a main or charging circuit, and a secondary battery, of suitable devices associated with the secondary battery and main or charging circuit, substantially as described, whereby the entire charging-current may be diverted around the battery and the fall of electrical potential of said secondary battery attending the near exhaustion of its charge actuates said devices to automatically switch said battery into the charging-circuit.

15. The combination, with an electric generator, a main or charging circuit, and a secondary battery, of devices for automatically breaking or opening the charging-circuit around said battery and simultaneously switching the latter into the charging-circuit when the electrical potential of said battery shall have reached a predetermined minimum, substantially as set forth.

16. The combination, with an electric generator, a main or charging circuit, and a secondary battery, with translating devices included in its discharging-circuit, of suitable means for automatically switching said battery and translating devices into the charging-circuit when the electrical potential of said battery shall have reached a predetermined minimum, substantially as set forth.

17. The combination, with an electric generator, a main or charging circuit, and a secondary battery, of devices adapted to be actuated through the initial agency of the rise of electrical potential of said battery for automatically switching a part of the charging-current around said battery, and then switching the battery out of the charging-circuit and diverting the entire charging-current around the battery, substantially as set forth.

18. The combination, with an electric generator, a main or charging circuit, and a secondary battery, of devices adapted to be actuated through the initial agency of the fall of electrical potential of said battery for automatically switching a part of the charging-current through said battery while the other part of said current passes through a short circuit, and then breaking the short circuit around the battery and diverting the entire charging-current through the secondary battery, substantially as set forth.

19. The combination, with an electric generator, a main or charging circuit, a secondary battery, an electric circuit of comparatively high resistance, arranged to serve as a shunt for the whole or part of said secondary battery, and mechanism for automatically breaking said shunt when the charging-current stops or is sufficiently decreased, and for closing said shunt when the charging-current is of sufficient strength, substantially as set forth.

20. The combination, with an electric generator, a main or charging circuit, and a secondary battery, of means for automatically switching the secondary battery out of the charging-circuit and closing said charging-circuit around the battery when the charging-current stops or becomes sufficiently reduced, and also when the secondary battery is sufficiently charged, substantially as set forth.

21. The combination, with an electric generator, a constantly-closed main or charging circuit, and a secondary battery, of means for automatically switching the charging-current through the battery when the charging-current has attained its normal strength, and for automatically switching the entire charging-current around the battery when sufficiently charged by the initial agency of the potential of the battery, substantially as set forth.

22. The combination, with an electric generator, a main or charging circuit, and a secondary battery, of suitable mechanism for automatically diverting the entire charging-current through the secondary battery, and for automatically diverting the entire charging-current around the battery by the initial agency of the potential of said battery while the charging-circuit is intact and the charging-current is of normal strength, substantially as set forth.

23. A system embracing an electric-current-generating apparatus, a main or charging circuit, two or more secondary batteries or groups of secondary batteries, and suitable devices connected with each of said batteries or groups of batteries, said devices each constructed and adapted to automatically and independently switch its battery or group of batteries gradually into the charging-circuit when the charging-current has approximately reached its normal strength, substantially as set forth.

24. A system embracing an electric-current-generating apparatus, a main or charging circuit, two or more secondary batteries or groups of secondary batteries, and suitable means associated with each battery or group of batteries for automatically, independently, and gradually switching out of the charging-circuit the battery or group of batteries connected therewith when sufficiently charged through the initial agency of the rise of electrical potential of said battery or group of batteries which attends the completion of the charging process, substantially as set forth.

25. A system embracing an electric-current-generating apparatus, a main or charging circuit, two or more secondary batteries or groups of secondary batteries, and suitable means associated with each battery or group of batteries for automatically and independently switching into the charging-circuit a battery or group of batteries through the initial agency of the fall of electrical potential of said battery or group of batteries which attends the near exhaustion of its charge, substantially as set forth.

26. A system embracing an electric-current generator, a main or charging circuit, two or more secondary batteries or groups of secondary batteries, and suitable means associated with each battery or group of batteries for automatically and independently switching each battery or group of batteries out of the charging-circuit, when sufficiently charged, through the initial agency of the rise of electrical potential of the battery or group of batteries which attends the completion of the charging process, and for automatically and independently switching each battery or group of batteries into the charging-circuit through the initial agency of the fall of electrical potential of the battery or group of batteries which attends the near exhaustion of its charge, substantially as set forth.

27. A system embracing an electric-current generator, a main or charging circuit, two or more secondary batteries or groups of secondary batteries, with translating devices included in their discharging-circuits, and suitable means associated with each battery or group of batteries for automatically and independently switching each battery or group of batteries and discharging-circuits thereof into the charging-circuit through the initial agency of the fall of electrical potential of said battery or group of batteries, and for automatically and independently switching said battery or batteries and discharging-circuits out of the charging-circuit through the initial agency of the rise of electrical potential of said battery or batteries, substantially as set forth.

28. A system embracing an electric-current generator, a main or charging circuit, secondary batteries, or groups of secondary batteries greater in number than the said generator is capable of charging simultaneously, and suitable means connected with each battery or group of batteries for automatically switching into the charging-circuit upon the establishment of the charging-current a limited number of secondary batteries suitable to the capacity of the said generator, substantially as set forth.

29. A system embracing an electric-current generator, a main or charging circuit, secondary batteries, or groups of secondary batteries greater in number than the said generator is capable of charging simultaneously, and suitable means connected with each battery or group of batteries for automatically switching into the charging-circuit upon the establishment of the charging-current a limited number of secondary batteries suitable to the capacity of the said generator, and for automatically and independently switching out of the charging-circuit each individual battery when charged, substantially as set forth.

30. A system embracing an electric generator, a main or charging circuit, secondary batteries, or groups of secondary batteries greater in number than the said generator is capable of charging simultaneously, and suitable means connected with each battery or group of batteries for automatically switching into the charging-circuit upon the establishment of the charging-current a limited number of secondary batteries, suitable to the capacity of the generator, for automatically and independently switching out of the charging-circuit each individual battery or group of batteries when charged, and for switching into the charging-circuit one or more additional batteries of the system, substantially as set forth.

31. A system embracing secondary batteries located individually or in groups at different points, an electrical charging-circuit adapted to connect said secondary batteries in series, a suitable electric generator included within said charging-circuit, and devices for automatically and independently switching each battery or group of batteries into the charging-circuit, and for automatically and independently switching each battery or group of batteries out of the charging-circuit, substantially as set forth.

32. The combination, with an electric-current generator, a main or charging circuit, and a secondary battery, of devices for automatically switching the secondary battery out of the charging-circuit by first introducing a resistance electrically parallel with the battery; second, disconnecting the battery from the main or charging circuit, leaving in lieu thereof the said resistance alone; and, third, short-circuiting the said resistance, substantially as set forth.

33. The combination, with an electric-current-generator, a main or charging circuit, and a secondary battery, of devices for automatically switching the secondary battery into the charging-circuit by first introducing a resistance into the main or charging circuit; second, connecting the battery into the charging-circuit electrically parallel with the said resistance; and, third, open-circuiting the said resistance, leaving in lieu thereof the battery, substantially as set forth.

34. A system embracing an electric-current generator, secondary batteries greater in number than the electric-current generator is capable of charging simultaneously, and devices for automatically switching into the charging-circuit one or more batteries corresponding in number to the capacity of the generator, then switching said batteries out of the circuit successively as charged, and then switching into the circuit uncharged or partly charged batteries, whereby the number of batteries corresponding to the capacity of the generator is kept in circuit while the generator is in operation, substantially as set forth.

In testimony whereof I have signed my name to this specification in the presence of two subscribing witnesses.

CHARLES F. BRUSH.

Witnesses:
LEVERETT L. LEGGETT,
ELBERT H. BAKER.